Figure 1:
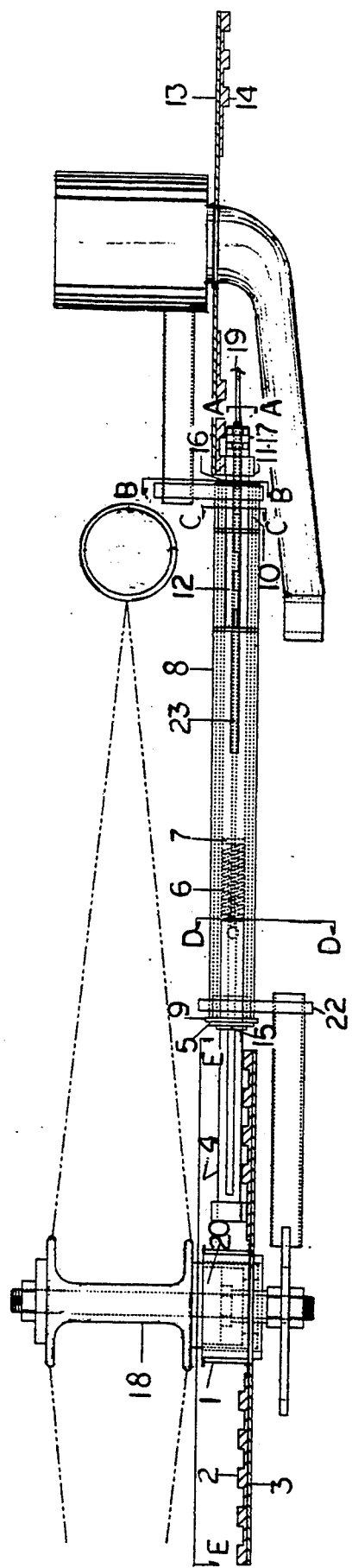

United States Patent [19]
Williams

[11] Patent Number: 5,342,075
[45] Date of Patent: Aug. 30, 1994

[54] VARIABLE SPEED DRIVE FOR A BICYCLE

[76] Inventor: David Williams, 7533 Briar Rose, Houston, Tex. 77063

[21] Appl. No.: 980,571

[22] Filed: Nov. 23, 1992

[51] Int. Cl.⁵ ............................... F16H 1/12
[52] U.S. Cl. .................. 280/236; 280/238; 280/260; 74/347
[58] Field of Search ............ 280/210, 231, 236, 238, 280/259, 260; 74/351, 347, 373

[56] References Cited

U.S. PATENT DOCUMENTS

| | | | |
|---|---|---|---|
| 3,782,210 | 1/1974 | Holleman | 74/217 B |
| 3,863,503 | 2/1975 | Loeb et al. | 280/238 X |
| 3,872,736 | 3/1975 | Houvouras | 74/337 |
| 3,934,481 | 1/1976 | Foster | 74/190.5 |
| 4,005,611 | 2/1977 | Jeffries | 74/416 |
| 4,029,332 | 6/1977 | Davis | 280/234 |
| 4,119,326 | 10/1978 | Porter | 280/236 |
| 4,447,068 | 5/1984 | Brooks | 280/260 |
| 4,813,302 | 3/1989 | Davidow | 280/238 X |
| 4,889,354 | 12/1989 | Wen | 280/236 |
| 4,955,247 | 9/1990 | Marshall | 280/238 X |
| 5,136,892 | 8/1992 | Ochs | 280/238 X |
| 5,184,838 | 2/1993 | Becoat | 280/260 X |

OTHER PUBLICATIONS
Bartleet's Bicycle Book, H. W. Bartleet.

*Primary Examiner*—Margaret A. Focarino
*Assistant Examiner*—Victor E. Johnson

[57] ABSTRACT

This invention relates to bicycles, specifically to an improved speed changing mechanism for a bicycle. The primary attribute of this invention is the utilization of a pair of pinion shafts and a pair of face gears to accomplish variation in speed. The face gear teeth and pinion are designed so that only one pair of teeth mesh at a time so that effectively they run as a pair of spur gears. The pinion shafts both forward and aft float inside a telescopic sleeve which allows a large number of gear ratios to be installed on the bicycle. The telescopic sleeve functions as a drive shaft connecting the output of the crank to a follower. The cyclist can select a gear ratio at the crank end by positioning the forward pinion. The aft pinion is positioned by a cable plus a cable lever. The invention eliminates the chain and provides a constant speed ratio at the crank. The telescopic sleeve eliminates the tension in the chain and will increase bearing life. The invention does not require major modifications to the bicycle because the free wheel mechanism and crank are not disturbed.

10 Claims, 4 Drawing Sheets

VARIABLE SPEED DRIVE FOR A BICYCLE

BACKGROUND-FIELD OF INVENTION

This invention relates to bicycles, specifically to an improved speed changing mechanism for a bicycle.

BACKGROUND-DESCRIPTION OF PRIOR ART

The problem is to design a variable speed mechanism that does not have the inherent disadvantages associated with the chain driven variable speed reducer.

To design an optimal variable speed mechanism for a bicycle a number of constraints must be meet. At least seven constraints must be considered. First, the mechanism must allow the cyclist to down shift to a lower gear ratio when the bicycle is at rest. Second, since the maximum power of the cyclist is probably obtained at a particular speed of the pedal, for best results on all kinds of road conditions the gearing should allow the pedal to operate at this particular speed no matter what the resistance. Also, the mechanism must not reduce the reliability of the bicycle. Since the trend is toward lighter bicycle designs, the mechanism must not add weight to the bicycle. Fifth, the mechanism must dovetail with the state of the art bicycle designs. Also the mechanism must increase the efficiency of the bicycle. And finally, the mechanism must be simple to manufacture.

The connection between the driver and the follower is usually accomplished by three methods, namely by sliding contact such as gears and cams, by belts, cords, and chains and, by links such as connecting rods.

Some of the more common variable speed changers using belts, cords and chains are described in U.S. Pat. Nos. 3,456,789 derailleur to Prewitt, 4,119,326 adjustable sheave and belt by Porter, eccentric chain wheel 4,889,354 to Wen and, 3,782,210 pin wheel gear and pinion to Holleman.

Some of the more common variable speed changers using a chainless drive are described in U.S. Pat. Nos. 4,029,332 friction drive to Davis, 4,005,611 perforated discs and sprockets to Jeffries, 3,934,481 friction drive to Foster, 3,872,736 to Houvouras.

Heretofore a number of designs using shafts and gears have been proposed. Although these mechanisms have certain advantages over the chain drive, they have objectionable disadvantages. First the gear trains are limited to a small number of gear ratios. This is caused from an increase in size, weight, and complexity of the gear train as the number of gear ratios is increased. Spur and bevel gears are also expensive to manufacture.

The belt drive combined with a variable sheave has the ability to vary the speed of the rear wheel continuously. The primary disadvantage to this arrangement is that the V-belt or flat belt must have the proper tension to prevent slippage. The belt could be tensioned by positioning the rear wheel much like tightening the fan belt on an automobile. Another arrangement would be to add an idler. The net effect of this is to increase the bearing load on both the crank and follower and increasing the strains on the chain stay.

The derailleur is a very popular device to change speeds on a bicycle. If properly maintained, the chain and sprocket is a very reliable device. The derailleur has numerous disadvantages. First, the cyclist can not down shift to a lower gear ratio if the bicycle is at rest. If the derailleur is not properly adjusted, the chain will jump off the sprockets or will not position the chain on the largest or smallest sprocket. The chain and sprocket does not provide a constant speed ratio, will stretch with use causing added wear and tear on both chain and sprocket, and the frictional resistance increases with increase in speed. The chain tension also adds to the bearing loads on the crank and follower and strains on the chain stay.

The eccentrically operating speed variation also utilizes a chain to vary the speed of the rear wheel. The chain will add bearing loads on the crank and follower and increase the strains on the chain stay.

OBJECTS AND ADVANTAGES

My invention has numerous advantages. First, the variable speed Drive allows the cyclist to down shift to a lower gear ratio if bicycle is at rest. Second, the variable speed drive allows a large number of gear ratios. Also the variable speed drive provides a constant speed ratio. Another advantage is reduction of the frictional resistance at high speeds by eliminating the chain and sprocket. Fifth, the variable speed drive reduces the loads on the crank and follower bears by eliminating the tension of the chain. Also the variable speed drive does not require major modifications to state-of-the-art bicycles. And finally, the variable speed drive utilizes a pinion and face gear which is a very reliable mechanism.

DRAWING FIGURES

Figure 2A:
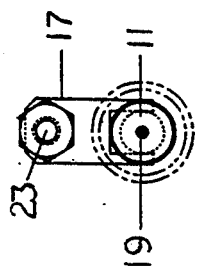
Figure 2B:
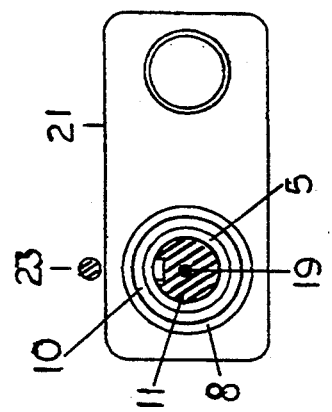
Figure 2C:
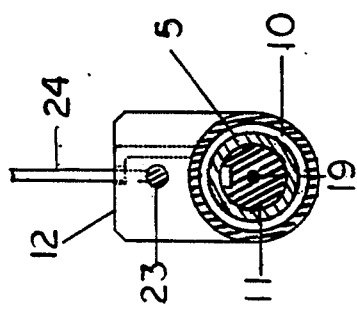
Figure 2D:
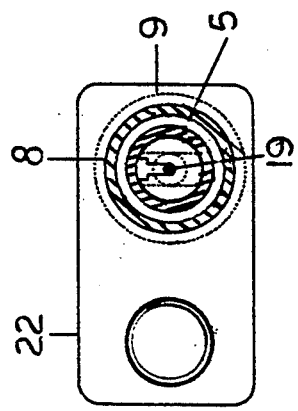
Figure 3E:
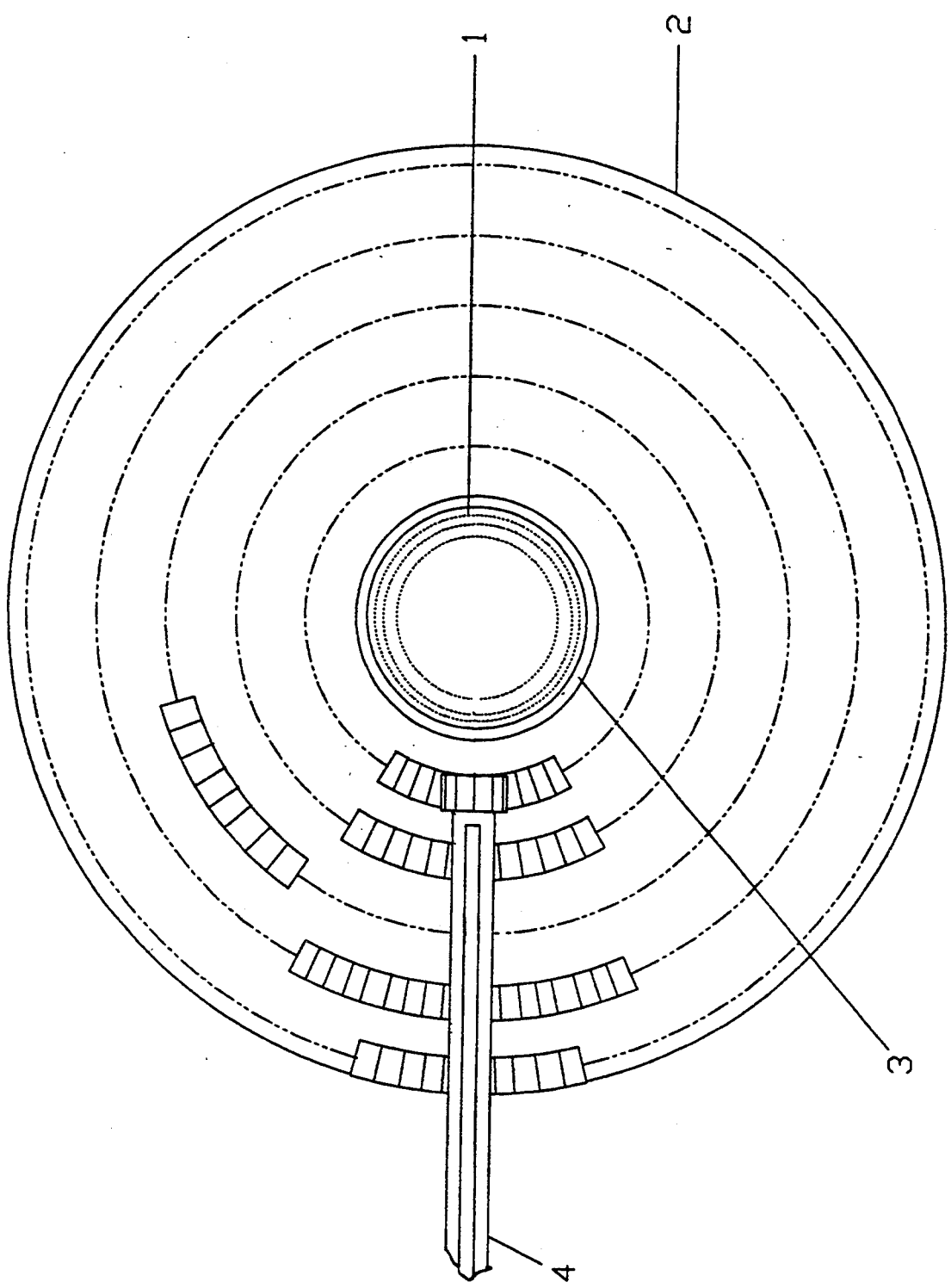
Figure 4:
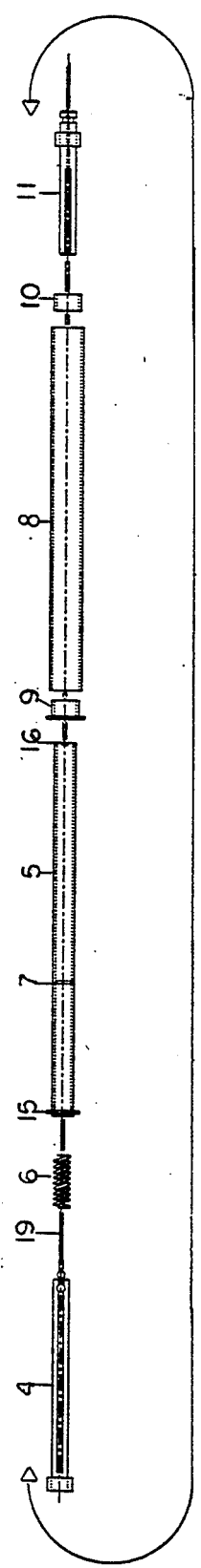

FIG. 1 is a plan view of variable speed drive in total.
FIG. 2A is a cross section of FIG. 1 along line A—A.
FIG. 2B is a cross section of FIG. 1 along line B—B.
FIG. 2C is a cross section of FIG. 1 along line C—C.
FIG. 2D is a cross section of FIG. 1 along line D—D.
FIG. 3 is a detail of rear pinion and face gear for FIG. 1.
FIG. 4 is an exploded view of support tube and drive shaft.

REFERENCE NUMERALS IN DRAWINGS

1 Sleeve
2 Aft face gear
3 Aft support disc
4 Aft single end pinion shaft
5 Sleeve shaft with thrust ring
6 Spring
7 Spring stop
8 Support tube
9 Aft lubricated bushing
10 Forward lubricated bushing
11 Forward double end pinion shaft
12 Position indicator
13 Forward support disc
14 Forward face gear
15 Aft key
16 Forward key
17 Adjusting fork
18 Hub
19 Cable with ball and shank
20 Free wheel mechanism
21 Forward figure eight bracket
22 Aft figure eight bracket
23 Positioning shaft
24 Shifting lever

DESCRIPTION FIGS. 1 THROUGH FIG. 4

FIG. 1 is an overall plan of the variable speed drive. Item 1 is sleeve bored slightly larger for a loose fit over the outside diameter of the free wheel mechanism item 20. This sleeve has two functions. First, the sleeve provides support for the aft backing disc 3 and also provides adjustment for alignment of the aft backing disc.

The aft face gear item 2 is secured to the backing disc 3 by flat head machine screws. The outside diameter of the face gear is determined by the number of gear ratios provided. The holes in the face gear to receive the machine screws are counter sunk so that the head of the screw is flush with the inboard surface of the face gear. The aft face gear is bored slightly larger than the free wheel mechanism so interference between the free wheel mechanism item 20 and face gear item 2 is minimized. The face gear item 2 and backing disc item 3 are two pieces instead of one integral piece to facilitate replacement as the gear ages. The face gear item 2 can be made from ferrous, stainless, non-metallic, and non-ferrous materials by a company such as Bristol Instrument Gears located in Forestville, CT. An initial selection for the face gear item 2 would be nylon.

The backing disc item 3 is bored sightly smaller than the free wheel mechanism. The outside diameter of the backing disc item 3 is the same as the diameter of the face gear item 2. The backing disc item 3 can be pressed onto the free wheel mechanism item 20 followed by soldering the outboard face of the backing disc item 3 to the free wheel mechanism item 20. An initial material for the backing disc would be steel.

Assembling the aft face gear item 3 to the free wheel mechanism item 20 is straight forward. The sleeve item 1 slides over the free wheel mechanism item 20. The nylon face gear item 2 is secured to the backing disc item 3 by machine screws. This assembly is pressed onto the free wheel mechanism item 20 until it butts firmly against the sleeve item 1. The outboard face of the backing disc item 3 is soldered to the free wheel mechanism item 20.

Modification of the chain stay is necessary to provide for a way for the support tube item 8. The two devices that provide for the connection between the modified chain stay and the support tube item 8 are items 21 and 22. The figure eight devices item 21 and item 22 are made by boring the lower hole to the outside diameter of the support tube item 8 and the upper hole to the outside diameter of the modified chain stay. The lower hole of the figure eight item 21 or item 22 is slipped over the support tube item 8 and tack welded. The upper hole of the figure eight item 21 or item 22 is slipped over the modified chain stay and tack welded. This is typical for the two supports fore and aft (see FIG. 2B and FIG. 2D).

The forward face gear is assembled in much the same way as the aft gear. The forward face gear item 14 is secured to the backing disc 13 by flat head machine screws. The outside diameter of the face gear is determined by the number of the gear ratios provided. The holes in the face gear to receive the machine screws are counter sunk so that the head of the screw is flush with the outboard surface of the face gear. The forward face gear item 14 is bored large enough to avoid any interference between crank or crank arm. The face gear item 14 and backing disc item 13 are two pieces instead of one integral piece to facilitate replacement as the gear ages. The face gear item 14 can be made from ferrous, stainless, non-metallic, and non-ferrous materials by Bristol Instrument Gears of Forestville, CT. An initial selection for the face gear item 14 would be nylon.

The backing disc item 13 may be drilled to match the crank arm or fixed permanently to the crank. This attachment will vary according to the manufacturer. The outside diameter of the backing disc item 13 is the same as the diameter of the face gear item 14. An initial material for the backing disc item 13 would be steel.

Referring to FIG. 4, Item 4 the aft single end pinion is a standard off the shelf pinion manufactured by Berg of East Rockaway, NY or Bristol Instrument Gears of Forestville, CT. A keyway is cut into the pinion item 4 to receive the key item 15. The length of this keyway will depend on the number of gear ratios provided. The shaft of the pinion item 4 must extend a suitable distance into the sleeve item 5 when the pinion item 4 is at its greatest travel to provide support and alignment for the pinion item 4. The face gear item 2 does not have any ability to position the pinion item 4. The pinion item 4 must be long enough to provide support and alignment for the pinion item 4 and also short enough to allow for deflections in the bicycle frame. The end of the shaft of the pinion has a hole drilled to accept the ball and shank of control cable item 19. The end of the pinion shaft item 4 is also provided with a axial groove extending from the land of keyway of the pinion item 4 to the center of the shaft. The groove is wide enough to accept the shank of the control cable item 19. The purpose of this arrangement is to provide a swivel for the cable item 19 as the pinion shaft item 4 rotates. An initial material for the double end pinion and single end pinion is either steel or aluminum.

The spring item 6 is a standard spring ground flat at both ends. The spring item 6 serves two purposes. First, the outer sleeve item 5 would tend to float fore and aft without a positioning device. As tension is applied to the control cable item 19 the spring item 6 is compressed causing a force to be exerted on the spring stop item 7. This force would move the shaft forward except for the restraining action of the thrust washer secured to the sleeve item 5. This washer rides against the lubricated bushing item 9 and provides stability for the sleeve item 5. The spring also provides the force necessary to position the pinion item 4 aft from one set of teeth to the next. As long as tension is on the cable both functions are satisfied.

Item 5 the sleeve shaft with thrust ring is a section of tubing with the inside diameter slightly larger than the outside diameter of the pinion shaft item 4. At the extreme ends both forward key item 16 and aft key item 15 are secured to the sleeve shaft item 5. Both keys are provided with a loose fit with the keyways in both item 4 and item 11. The function of these keys is to allow both pinions item 4 and item 11 to move axially and also provide a means of transmitting rotary motion from the sleeve item 5 to the pinions item 4 and item 11.

Item 9 flange lubricated bushing is a standard oil-impregnated bushing manufactured by Berg of East Rockaway NY. The inside diameter of the bushing is larger than the outside diameter of the sleeve item 5. The outside diameter is smaller than the inside diameter of the support tube item 8. This is the aft bearing for item 5.

Item 10 plain lubricated bearing is the forward bearing for the sleeve item 5. This bushing has the same inside diameter and outside diameter as the flange bushing item 9. This bushing is secured to the support tube item 8 by putting a slight kink in the wall of the support tube item 8 and then pressing the bushing in place until it is flush with the end of the support tube. The end of the support tube can then be peened to permanently secure the bushing item 10.

Item 11 double end pinion shaft is a standard off the shelf pinion manufactured by Berg of East Rockaway NY. The length of the pinion shaft item 11 is long enough to keep the pinion item 11 aligned and supported with the face gear item 14 but short enough to allow the bicycle frame to deflect. This pinion item 11 has a keyway cut into the shaft to receive the key item 16. The pinion shaft item 11 is drilled the full length along the center line with a small hole large enough to accommodate the control cable item 19. Also a groove is machined at the forward end of the pinion shaft item 11 to mate with the adjusting fork item 17. The keyway allows the pinion shaft item 11 to travel from low gear ratios to higher gear ratios and at the same time provides a means of transferring the rotary motion of the pinion shaft item 11 to the sleeve item 5.

Assembly of the shifting mechanism is straight forward. The control cable item 19 is threaded through the spring item 6, the sleeve item 5, the bushing item 9, the support tube item 8, the bushing item 10, and through the hole provided in the forward double end pinion item 11. Both bushings item 9 and item 10 are installed into the support tube item 8. The sleeve with thrust ring item 5 is inserted into bushing 9 and bushing 10. The control cable ball and shank item 19 is attached to the aft single end pinion item 4 by means of the hole and groove provided at the end of pinion shaft item 4. By pulling the control cable and keeping both keys and keyways on the pinions aligned the pieces will merge into an aggregate. The control cable item 19 is connected by suitable linkage to a control lever which will provide the necessary tension for the unit.

Referring to FIG. 2A, the adjusting fork item 17 mates with the groove in the forward double end pinion item 11. The fit is loose to allow the pinion shaft item 11 to rotate. The positioning shaft item 23 is attached to the adjusting fork item 17 with nuts. The shaft is inserted into two holes provided with the position indicator item 12. Shifting lever item 24 is clamped or welded to the shaft item 23. The position indicator item 12 is made from heavy gauge sheet metal and is equipped with teeth that correspond with the meshing of the double end pinion item 11 and the face gear teeth item 14. The position indicator 12 is tack welded to the support tube item 8.

OPERATION FIGURE 1

As the crank is turned the double end pinion item 11 turns from top to bottom. The key item 16 and keyway cut into pinion shaft item 11 transfers the rotary motion from the pinion shaft item 11 to the sleeve shaft item 5. The sleeve shaft item 5 transfers its rotary motion to the aft single end pinion item 4 via the key item 15 and keyway of the single end pinion item 4. This pinion shaft item 4 turns the face gear item 2 and also the wheel in the direction of the crank. The lubricated bushings item 9 and item 10 support the sleeve shaft item 5. These loads are transmitted to the support tube item 8. These loads are then transferred to the chain stay via the figure eight bracket item 21 and item 22. With proper tension on the control cable 19, the single end pinion item 4 compresses the spring item 6 and this spring force keeps the thrust ring of the sleeve shaft item 5 in contact with the lubricated bushing item 9 to provide axial stability. To change gear ratios at the rear hub, the tension in the control cable is either increased or decreased. Increasing the tension moves the pinion item 4 forward to mesh with another gear set. Decreasing the tension allows the spring item 6 to move the pinion item 4 aft to another gear set. To change gear ratios at the crank end, the shift lever item 24 is moved from one set of teeth provided on the position indicator item 12. This moves the shaft item 23 either fore or aft depending on the cyclist selection. The shaft item 23 moves the adjusting fork item 17 which in turn moves the double end pinion item 11. Any changing of gear ratios would require the cyclist to momentarily stop pedaling, change gear ratios, and then resume pedalling.

CONCLUSION, RAMIFICATIONS, AND SCOPE OF INVENTION

Thus the reader will see that the variable speed drive will increase the efficiency of bicycle and the cyclist. The variable speed drive will be more reliable than the chain and belt drives. Phis system is also lightweight and easy to fabricate without unduly modifying the current bicycle designs. The face gear can be increased in size to provide more gear ratios without adding more complexity to bicycle. The variable speed drive allows the cyclist to down shift when the bicycle is at rest. The spur gear and face gear provide a constant speed ratio and friction does not increase with speed as is the case with chain drives. The elimination of tension in the chain or belt will increase bearing life in the rear hub. While my above description contains many specifics, these should not be construed as limitations on the scope of the invention, but rather as an exemplification of one preferred embodiment thereof. Many other variations are possible. For example the spur gear and face gear might be replaced with a friction drive to provide a continuously varying speed reduction. The face disc could be rough as sandpaper and the pinion with an expendable material. Another possibility might be to replace the control cable with a rod and position the rod to achieve speed variation. There is a possibility that the supporting tube may be eliminated by having one pinion shaft slid inside the other and providing support at the rotating shafts. Roller bearings might be substituted for the bushings. This would reduce the friction even more. There is chance that a small hydraulic device maybe used to vary the position of the pinions. The spring maybe placed inside a hollow aft pinion shaft. Accordingly, the scope of the invention should be determined not by the embodiments illustrated, but by the appended claims and their legal equivalents.

I claim:

1. A variable speed drive for a bicycle having a frame comprising:
   a forward support disc permanently fixed to a bicycle crank rotatably mounted on said bicycle frame,
   said forward support disc supporting a forward face gear,
   a forward axially floating pinion shaft operatively connected to said forward face gear for transferring torque therebetween, said forward pinion shaft having a hole extending along a centerline thereof,
   an aft support disc permanently fixed to a freewheel mechanism of said bicycle, said aft support disc supporting an aft face gear,
   a bicycle aft axially floating pinion shaft operatively connected to said aft face gear for transferring torque therebetween, rotational means comprising a sleeve shaft coaxial with and operatively connecting said forward and aft pinion shafts for transferring axial rotational motion therebetween, a support means connected to said frame having a plurality of anti-friction bearings coaxial with and supporting said rotational means.

a control cable means for attachment to a speed control lever, said control cable means having one end attached to said aft pinion shaft for axially positioning said aft pinion shaft with respect to said aft face gear, said control cable means extending along a centerline of said rotational means and through said forward pinion shaft hole, and a positioning means connected to said support means and said forward pinion shaft for axially positioning said forward pinion shaft with respect to said forward face gear.

2. The variable speed drive of claim 1 wherein said forward axially floating pinion shaft and said aft axially floating pinion shaft are manufactured from a material selected from the group consisting of hard and durable materials such as stainless steel, aluminum, fiberglass, and plastic.

3. The variable speed drive of claim 1 wherein said forward support disc, said aft support disc, said forward face gear, and said aft face gear are manufactured from a material selected from the group consisting of hard and durable materials such as stainless steel, aluminum, fiberglass, and plastic.

4. The variable speed drive of claim 1 wherein said rotational means is a tube supported by said support means and rotational motion is transferred from said forward axially floating pinion shaft and said aft axially floating pinion shaft to said tube by means of a plurality of keys each cooperating with a respective groove cut axially at the outside diameter of both of the forward and aft pinion shafts, said keys attached to said tube.

5. The variable speed drive of claim 1 wherein said support means is a structural shape selected from a group consisting of sleeves, box shapes, D shapes, bars, and tubes and said anti-friction bearings are selected from a group consisting of lubricated bushings and roller bearings.

6. The variable speed drive of claim 1 wherein said control cable means ia a swivelling cable extending through both said forward pinion shaft hole and through said centerline of said rotational means and rotationally connected to said biased aft axially floating pinion shaft.

7. The variable speed drive of claim 1 wherein said control cable means ia a swivelling rod extending through both said forward pinion shaft hole and through said centerline of said rotational means and rotationally connected to said biased aft axially floating pinion shaft.

8. The variable speed drive of claim 1 wherein said forward support disc and said forward face gear are one integral piece and are manufactured from a material selected from the group consisting of hard and durable materials such as stainless steel, aluminum, fiberglass, and plastic.

9. The variable speed drive of claim 1 wherein said forward axially floating pinion and said aft axially floating pinion are friction wheels.

10. The variable speed drive of claim 1 wherein said aft support disc and said forward support disc are friction discs.

* * * * *